UNITED STATES PATENT OFFICE.

ROBERT GEORGE JACKSON, OF TACOMA, WASHINGTON.

FOOD COMPOUND.

1,153,925.      Specification of Letters Patent.      Patented Sept. 21, 1915.

No Drawing.      Application filed September 10, 1914. Serial No. 861,111.

*To all whom it may concern:*

Be it known that I, ROBERT GEORGE JACKSON, citizen of the United States, residing at Tacoma, in the county of Pierce and State of Washington, have invented certain new and useful Improvements in Food Compounds, of which the following is a specification.

This invention relates to an improved food compound for human consumption and has for its primary object to provide a compound of this nature which has certain therapeutic as well as nutritive qualities.

The invention has for a further object to provide a food compound containing certain ingredients which act as an aid to digestion, having a healing and soothing effect upon the intestinal organs and which operate to promote the functional activities of the bowels and thereby assist in the excretion of waste material.

In carrying out my invention, I employ, as the prime ingredients thereof, pure hard winter wheat, pure white oats, and pure ground flax. In the preparation of these ingredients, the oats, wheat and flax are ground whole including the outer bran hulls, the oats being first kiln dried. The oats and a part of the wheat are ground upon a steel bur into finely cut granules, but without reducing the same to flour. A second portion of the wheat is passed through three pairs of grinding rollers until the wheat kernels are reduced to a finely comminuted form.

Having prepared the several food ingredients in the above manner, 20% of oats is mixed with 20% of the whole ground wheat and 20% of the finely comminuted wheat. To this I then add 20% of pure ground flax and 20% of prime wheat bran. All of these ingredients are thoroughly mixed together and then placed in suitable containers. The wheat bran in the compound lessens the tendency to starch fermentation, and creates bulk for the natural stimulation of the nervous, secretory and muscular organs of digestion. The bran also aids in the excretion of waste from the digestive tract. Flax is used to aid in digestibility and increase the nutritive property of the compound. It is a well known fact that flax is the most easily digested of grain seeds and is at the same time substantially three times as nutritious as wheat. The flax is further used as a demulcent, or for its healing quality, whereby the irritated intestinal tract is soothed and the walls thereof lubricated. As such abnormal conditions frequently bring on spasms, the extreme importance of the flax in my improved compound will be appreciated. The flax ingredient by remedying the irritated or inflamed condition of the intestinal tract, thus also obviates the absorption of all the moisture in the waste material, so that the progress of the latter through the intestines is facilitated and its expulsion therefrom finally accomplished in a natural manner. In this manner a constipated condition of the digestive system will be remedied in the use of my improved food compound.

The food may be eaten regularly at meal times and in any desired quantity. The same is very palatable and of high nutritive value. It will be appreciated that the product may also be produced and marketed at nominal expense.

The bulky waste of the brans so stimulates muscular and secretory activity that a greater amount of digestive fluids is mixed with the nutritional elements of the food mass, thereby making digestion more complete, while at the same time this increased muscular activity, aided by the lubricating quality of the flax hastens the waste content along the canal of the intestinal tube so that it reaches the bowel outlet before much of its moisture content has been absorbed. This fecal mass being of large bulk naturally stimulates desire for evacuation and, being soft, it is easily expelled. It thus becomes a natural aid to digestion and a really great relief to the constipated.

What I claim is:

The herein described food compound for human consumption including oats 20% and wheat 20%, the said ingredients being ground whole into cut granules including the bran hulls thereof finely comminuted wheat 20%, prime wheat bran 20% and pure ground flax 20%, all of said ingredients being thoroughly mixed or commingled together substantially as and for the purpose set forth.

In testimony whereof I hereunto affix my signature in the presence of two witnesses.

ROBERT GEORGE JACKSON.

Witnesses:
    OLIVE MORGAN,
    DON. BROWN.